United States Patent [19]

Annas et al.

[11] 4,453,034
[45] Jun. 5, 1984

[54] ONE DIE SYSTEM OF COMPRESSION TRANSMISSION FITTINGS

[75] Inventors: Nick S. Annas, Red Hook; Russell H. Kraft, Fishkill, both of N.Y.

[73] Assignee: Fargo Mfg. Company, Inc., Poughkeepsie, N.Y.

[21] Appl. No.: 335,880

[22] Filed: Dec. 30, 1981

[51] Int. Cl.³ .............................................. H01R 4/20
[52] U.S. Cl. ................... 174/79; 174/84 C; 174/90; 339/276 D; 403/278; 403/284
[58] Field of Search ............ 174/79, 84 C, 90; 403/278, 284, 285; 339/276 D

[56] References Cited

U.S. PATENT DOCUMENTS

| | | | |
|---|---|---|---|
| 1,827,297 | 10/1931 | Moore | 174/94 R |
| 3,125,630 | 3/1964 | Wahl | 174/90 |
| 3,996,417 | 12/1976 | Annas | 174/79 X |
| 4,035,095 | 7/1977 | Hughes, Jr. | 403/285 X |
| 4,095,328 | 6/1978 | Cawthorne | 403/284 X |
| 4,214,121 | 7/1980 | Charneski et al. | 174/84 C |

FOREIGN PATENT DOCUMENTS 1133000 7/1962 Fed. Rep. of Germany ........ 174/79
1440741 2/1969 Fed. Rep. of Germany ........ 174/90

OTHER PUBLICATIONS

Electrical World, Mar. 23, 1964; vol. 161, No. 12; p. 46; Advertisement, American Pamcor, Inc. Valley Forge, Penna.

*Primary Examiner*—J. V. Truhe
*Assistant Examiner*—Morris H. Nimmo
*Attorney, Agent, or Firm*—Kane, Dalsimer, Kane, Sullivan & Kurucz

[57] ABSTRACT

A core grip for use in conjunction with a conduction cable having an outer conductor and core element in a hollow elongated compression valve wherein the grip is disposed on an end portion of the core of the cable after the outer conductor has been stripped away and the compression valve is disposed about the grip and is crimped into an engagement with the grip which in turn mechanically engages the core wherein the core grip is formed from two separate semi-circular cylindrical halves made of a deformable metal which when joined together from a solid cylindrical grip having an axial core therethrough coated with grit which is adapted to receive the core of the cable.

7 Claims, 4 Drawing Figures

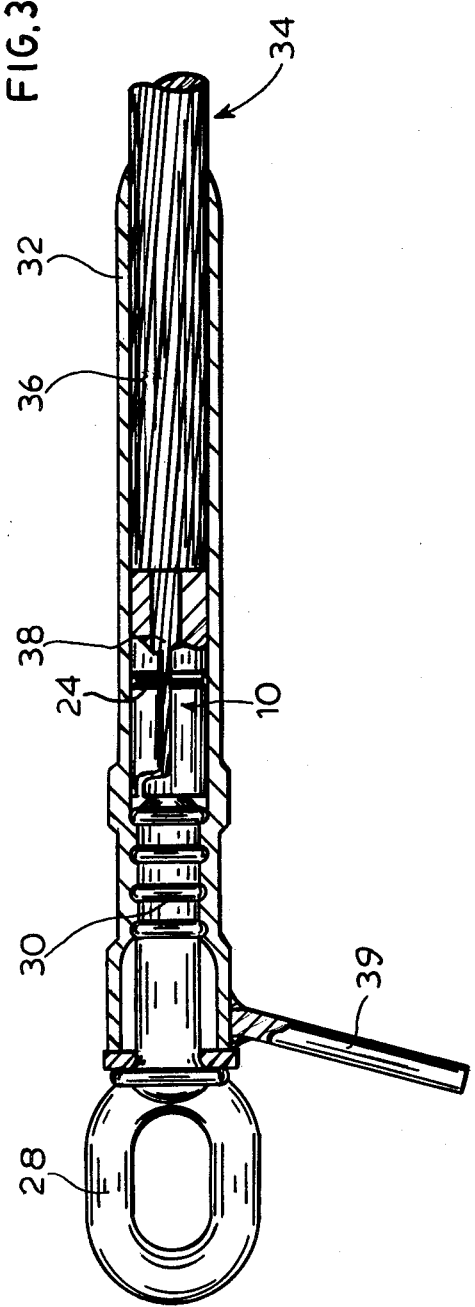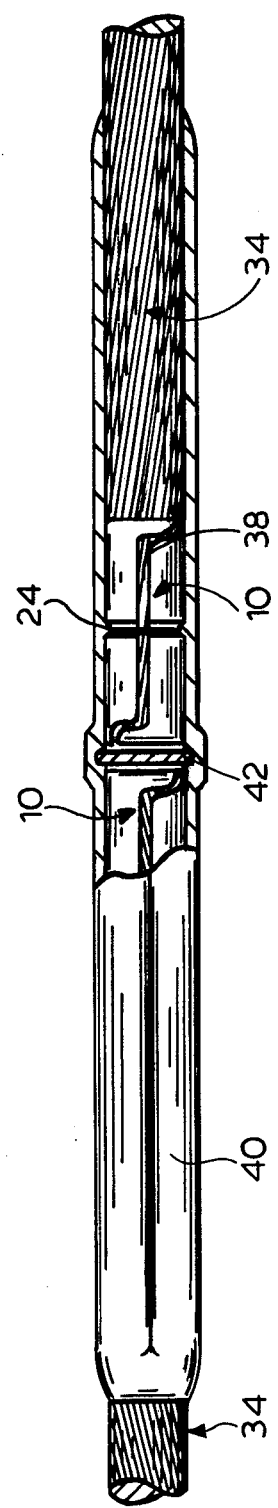

4,453,034

ONE DIE SYSTEM OF COMPRESSION TRANSMISSION FITTINGS

FIELD OF THE INVENTION

The present invention relates to electrical connectors for a core reinforced cable.

BACKGROUND OF THE INVENTION

There is presently known transmission line electrical cables which utilize a conductor formed as twisted strands of a conductive material i.e., aluminum or copper etc., wrapped or braided about a steel core. In the past, there have been proposed means of dead ending or splicing the transmission conductors which required separate crimping means for use on the steel core and one on the aluminum components of the line. Since two crimping steps were involved, it suffered such obvious disadvantages as requiring additional time and equipment in addition to being awkward.

In an effort to overcome the requirement of the two crimp method, U.S. Pat. No. 3,996,416 issued Dec. 7, 1976, discloses an aluminum core grip for connecting the core reinforced cable to another cable or to a cable accessory. Illustrated in FIG. 1 herein, is the core grip proposed by the aforenoted patent comprising a single piece element, elongated with a bore, sized to the specific steel core diameter of the cable on which it will be used, lined with grit therethrough. The core grip is provided with three (or four) longitudinally extending radially outwardly directed lobes. To provide the connection, at the end of the cable to be worked, a portion of the conductor is stripped from the cable exposing the steel core for about the length of the core grip. The steel core is then forced into the bore and the cable with the grip therein is inserted into one end of a compression barrel in which at the opposite end is inserted the element (cable, dead end etc.) that the cable is being joined in an end to end relation. The compression barrel is now crimped to effect a splice or dead end connection. The lobes during crimping give way to effect a contact between the cable and the compression barrel.

While having advantages over the two crimp operation, this means of connecting transmission lines suffers several disadvantages. First, a single piece core grip is utilized requiring the steel core to be forced into the bore thereof the diameter of which is sized to the steel core. If the steel core has a poor lay, this may be difficult to accomplish and time consuming.

In addition, it has been found that the absence of sufficient grit in connections of this nature can severly reduce the overall holding strength of the connection. If core slippage results, this leads to an overloading and tensile breaks in the aluminum strands at something less than rated breaking strength of a composite conductor.

Since the single piece device requires a forcing of the steel core into the bore, during this insertion the grit therein tends to become dislodged and lost resulting in an undesirable situation with the possible results aforenoted.

Furthermore, in the three lobe core grip, a specific geometry of the lobes is used to attain the holding function. The geometry is such that the aluminum will collapse and place a compressive force on the steel core, due to the compressive force placed on the compression barrel by external pressure applied by the crimping dies. However, the straightness of a compressed connector is dependent upon uniform longitudinal extrusion of the composite connector which is done in sections. The composite must be origin symmetric in order to insure uniform longitudinal extrusion outwardly from the compression dies. However, without origin symmetry as in the case of the three lobe core grip, the connector composite will tend to bow away from the side containing more material.

SUMMARY OF THE INVENTION

Accordingly, it is an object of the invention to provide for a core grip which eliminates the disadvantages suffered by core grip heretofore utilized as aforenoted.

This and other objects and advantages will be realized by the present invention which provides for a core grip which is formed out of two half circle cylindrical elements formed with respective longitudinal grooves therein coated with grit. The elements are intended to be placed together to form a solid cylindrical core grip with the steel core disposed in the grooves. In this regard, the aluminum conductor strands are stripped away, for a length of the core equal to the length of the grooves in the core grip. An elastic means is utilized about the two elements to maintain them in place. If the cable is being joined to a dead end then the comression barrel is placed over the core grip and an appropriate length of cable on one side and the dead end on the other. This is then crimped in a standard fashion.

If a splice is to be effected, then each end of the cable to be joined is fitted with a core grip and placed together in an abutting relationship in a compression barrel and crimped.

Through the use of the two piece grip, there is eliminated the need to force the core through the grip thereby solving the problem of a core with an improper lay while also advantageously avoiding a loss of grit.

BRIEF DESCRIPTION OF THE DRAWINGS

The above mentioned and other advantages of the invention will become more apparent by reference to the following description which is to be taken in conjunction with the accompanying drawings wherein:

FIG. 3 is a partially sectionally view of a dead end coupled to a core reinforced transmission cable, incorporating the teachings of the present invention;

FIG. 4 is a partially sectional view of a splice connection of a core reinforced transmission cable, incorporating the teachings of the present invention.

DETAILED DESCRIPTION OF THE PREFERRED EMBODIMENT

Figures 1, 2:
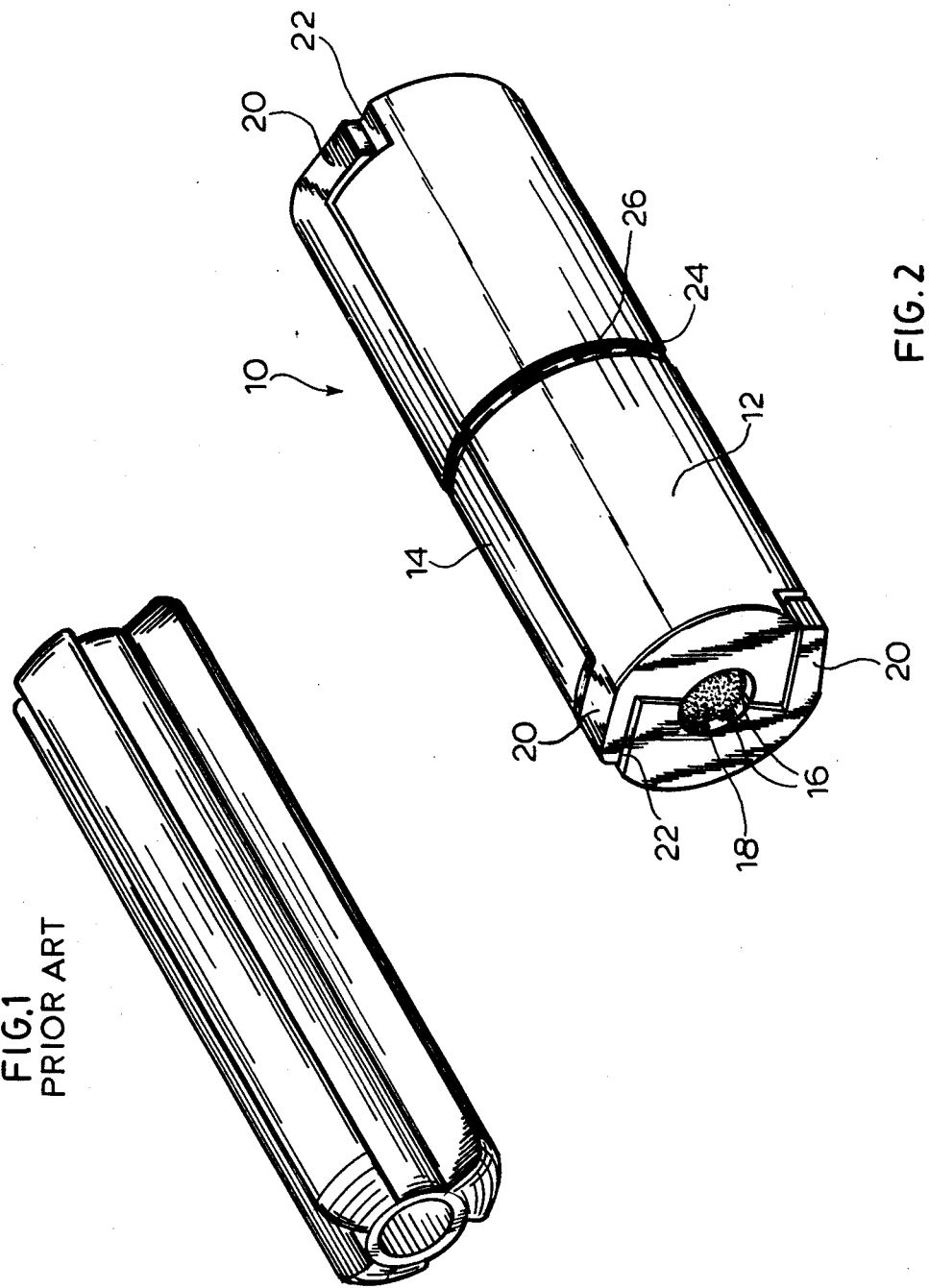
FIG. 1 is a perspective view of a core grip heretofore utilized and labelled as prior art.
FIG. 2 is a perspective view of a cylindrical core grip incorporating the teachings of the present invention.

With reference now to the drawings, there is shown a core grip 10 comprising two semi-circular solid cylindrical halve elements 12 and 14. Each halve is cast from preferably steel, aluminum or any other material suitable for gripping. The outer surface of the core grip 10 is relatively smooth and at a radius designed for the inner diameter of the specific compression barrel utilized as shown in FIGS. 3 and 4, later discussed.

A center groove 16 is provided in each element 12 and 14 throughout its longitudinal length, which when the elements are together forms a bore through the core grip 10. Throughout the entire bore formed from groove 16, there is tenaciously bonded grit 18, preferably #80 aluminum oxide.

Tabs 20 are provided on each end of elements 12 and 14 and are adapted to fit into corresponding slots 22 formed in the opposite elements to prevent relative longitudinal movement of the two elements during installation. An elastic band 24 is provided in an annular groove 26 so as to keep the core grip 10 in one piece for shipping, handling and installation.

Particular applications regarding the use of the core grip 10 can be seen in FIGS. 3 and 4 which relate to a dead end and splice composite connections respectively. To effect a dead end as shown in FIG. 3, there is provided an eye or clevis 28 having a shank 30 attached thereto. A compression barrel 32, preferably made of aluminum, is provided, and is of sufficient length to couple the clevis 28 and a conductor cable 34. The conductor cable 34 comprises an outer conductor 36 preferably made of stranded aluminum, and a steel or other suitable metal center core 38.

To effect the dead end, the shank 30 attached to eye 28 is placed in one end of compression barrel 32. The conductor cable 34 is stripped of conductor 36 for approximately the length of the grip 10, plus an additional amount such as one fourth inch for example, to expose a corresponding length of steel core 38. The grip 10 is then separated and placed over the exposed core 38 so that it fills the grooves 16 containing the grit 18. The tabs 20 and slots 22 interlock and the elastic band 24 is placed in the groove 26 to maintain the grip in position.

The conductor cable 34 with the core grip 10 thereon is then placed endwise into a compression barrel 32 (which may have already been prefilled with a joint compound) of appropriate length and diameter in an abutting relationship with shank 30. The compression barrel 32 is then crimped in a known fashion to effect a connection. Note that upon crimping, the outer surface of the core grip 10 is in contact with virtually all of the inner diameter of the compression barrel 32 and grooves 16 engage the outer diameter of the steel core 36, to lock the core grip 10 in place and preventing core slippage.

Note also, the compression barrel 32 may be provided with a tongue 39 at its clevis or eye end which is typical of dead ends.

Turning now to FIG. 4, there is shown a splice connection which is similar to the dead end aforenoted. In a splice connection however, the purpose is to connect two ends of the cable 34. An opened ended compression barrel 40 of sufficient length and diameter to effect a connection is therefore provided, again perhaps prefilled with joint compound and having a stop 42 maintained therein intermediate its ends.

The ends of conductor 34 to be joined are fitted with individual core grips 10 in the same manner as aforenoted, and inserted endwise into barrel 40 is then crimped in a standard fashion effecting the connection with the advantages aforenoted.

Thus by the use of the core grip 10, simple and efficient composite connections are realized, and although a preferred embodiment has been disclosed and discussed in detail herein, its scope should not be limited thereby, rather its scope should be determined by that of the appended claims.

What is claimed is:

1. A core grip for use in conjunction with a conduction cable having an outer conductor and core and a hollow elongated compression barrel, wherein said core grip is adapted to be disposed about the core, and the barrel is adapted to be disposed about said core grip and is crimped into a mechanical engagement with the core grip which in turn mechanically engages the core, said core grip comprising at least two separable semi-circular cylindrical grip elements, each having a respective longitudinal groove therethrough each of which forms a part of an axial bore in the core grip adapted to receive the core, means at the ends of each of said elements defining a tab and slot, tab and slot of one grip element being respectively engageable in a mating fashion with the slot and tab of another grip element when said grip elements are coupled together so as to prevent the relative longitudinal movement therebetween and form a solid cylindrical said core grip when positioned about said core which upon crimping of a compression barrel about the core grip causes mechanical engagement therewith and in turn the core grip with the core.

2. In combination a first core grip and a hollow elongated compression barrel for use in conjunction with a conduction cable having an outer conductor and core the first core grip comprising: at least two separable semi-circular cylindrical grip elements each having a respective longitudinal groove therethrough each of which forms a part of an axial bore in the first core grip adapted to receive the core of a conduction cable, means at the ends of each of said elements defining a tab and slot, tab and slot of one grip element being positioned respectively engageable in a mating fashion with the slot and tab of another grip element when said grip elements are coupled together so as to prevent the relative longitudinal movement therebetween and form a solid cylindrical said first core grip when positioned about said core which upon crimping of said compression barrel about the first core grip causes mechanical engagement therewith and in turn the first core grip with the core.

3. The combination in accordance with claim 2 which includes a dead end attachment adapted to be disposed in an end of said barrel in an end to end relationship with said first core grip to effect a dead ending of the conduction cable.

4. The combination in accordance with claim 2 which includes a second core grip adapted to be disposed on the core of a second conduction cable after the outer conductor has been stripped away from a portion of the second cable, said second core grip adapted to be disposed in said compression barrel in end to end relationship with the first core grip.

5. The invention in accordance with claims 1, 2, 3 or 4 which includes grit in the grooves.

6. The invention in accordance with claim 5 in which the said grip elements in a mating relationship have a circumferential groove and a resilient band located in said circumferential groove so as to maintain said grip elements together.

7. The invention in accordance with claims 1 or 2 which include a circumferential groove on the outer surface of the grip elements into which a portion of the compression sleeve enters upon crimping whereby the engagement of the portion of the sleeve with the circumferential groove resisting withdrawal of the core grip therefrom.

* * * * *

UNITED STATES PATENT AND TRADEMARK OFFICE
CERTIFICATE OF CORRECTION

PATENT NO. : 4,453,034

DATED : June 5, 1984

INVENTOR(S) : Nick S. Annas et al

It is certified that error appears in the above-identified patent and that said Letters Patent is hereby corrected as shown below:

Column 1, line 23, change "3,996,416" to --3,996,417--

Column 3, line 35, change "compount" to --compound--.

Signed and Sealed this

Twenty-sixth Day of February 1985

[SEAL]

Attest:

DONALD J. QUIGG

Attesting Officer     Acting Commissioner of Patents and Trademarks